US012797891B2

(12) United States Patent
Saksena et al.

(10) Patent No.: US 12,797,891 B2
(45) Date of Patent: Nov. 17, 2026

(54) HOT MELT ADHESIVE LEVEL SENSING DEVICE AND SYSTEM

(71) Applicant: Illinois Tool Works Inc., Glenview, IL (US)

(72) Inventors: Atul Saksena, Hendersonville, TN (US); Edward Wayne Bolyard, Jr., Old Hickory, TN (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 27 days.

(21) Appl. No.: 19/097,722

(22) Filed: Apr. 1, 2025

(65) Prior Publication Data

US 2025/0312815 A1 Oct. 9, 2025

Related U.S. Application Data

(60) Provisional application No. 63/575,869, filed on Apr. 8, 2024.

(51) Int. Cl.
*B05C 11/10* (2006.01)
*G01F 23/22* (2006.01)

(52) U.S. Cl.
CPC ............ *B05C 11/101* (2013.01); *G01F 23/22* (2013.01)

(58) Field of Classification Search
CPC ... B05C 11/101; B05C 11/1042; B05C 5/001; B05C 11/10; G01F 23/22; G01F 23/247; H01B 1/02; H01B 1/0244
USPC ......... 222/1, 54, 56, 64, 146.1, 146.2, 146.5
See application file for complete search history.

(56) References Cited

U.S. PATENT DOCUMENTS

| | | | |
|---|---|---|---|
| 4,355,222 | A | 10/1982 | Geithman et al. |
| 4,935,093 | A | 6/1990 | Reeb |
| 5,294,290 | A | 3/1994 | Reeb |
| 5,407,101 | A | 4/1995 | Hubbard |
| 5,414,247 | A | 5/1995 | Geithman et al. |
| 6,215,109 | B1 | 4/2001 | Bolyard, Jr. |
| 6,334,554 | B1 | 1/2002 | Bolyard, Jr. et al. |
| 6,891,130 | B2 | 5/2005 | Evanyk |
| 7,067,009 | B2 | 6/2006 | Bolyard, Jr. et al. |

(Continued)

FOREIGN PATENT DOCUMENTS

| | | | |
|---|---|---|---|
| CN | 108037151 | A | 5/2018 |
| EP | 0333233 | B1 | 5/1991 |

(Continued)

OTHER PUBLICATIONS

International Search Report and Written Opinion mailed Jul. 18, 2025 for corresponding PCT/US25/22717 (11 pages).

(Continued)

*Primary Examiner* — David J Walczak
(74) *Attorney, Agent, or Firm* — Carroll, Hoette & Butscher, LLC; Christopher R. Carroll

(57) ABSTRACT

A sensing system includes a temperature sensor that measures a temperature inside a hopper, a heating element that generates heat inside the hopper to melt or heat an adhesive in the hopper according to a duty cycle, and a controller that examines the temperature measured inside the hopper and determines whether the duty cycle of the heating element is to be changed based on the temperature that is measured. The controller determines a level of the adhesive in the hopper based on the duty cycle of the heating element.

20 Claims, 3 Drawing Sheets

(56) References Cited

U.S. PATENT DOCUMENTS

| | | | |
|---|---|---|---|
| 7,874,456 B2 | 1/2011 | Bolyard, Jr. et al. | |
| 9,119,230 B2 * | 8/2015 | Brudevold | B67D 99/00 |
| 10,337,898 B2 | 7/2019 | Rohring et al. | |
| 2004/0195355 A1 | 10/2004 | Bolyard, Jr. et al. | |
| 2004/0218660 A1 | 11/2004 | Heerdt et al. | |
| 2005/0041723 A1 | 2/2005 | Heerdt et al. | |
| 2005/0274318 A1 | 12/2005 | Bolyard et al. | |
| 2006/0081650 A1 | 4/2006 | Axinte et al. | |
| 2008/0190957 A1 | 8/2008 | Bolyard, Jr. et al. | |
| 2018/0236483 A1 * | 8/2018 | Lind | B05B 7/1404 |
| 2022/0373614 A1 | 11/2022 | Estelle | |

FOREIGN PATENT DOCUMENTS

| | | |
|---|---|---|
| EP | 2724786 A1 | 4/2014 |
| JP | 11028410 A | 2/1999 |
| JP | 2015532941 A | 11/2015 |

OTHER PUBLICATIONS

ITW Dynatec, “Dynamelt M Series Adhesive Supply Unit Operations and Service Manual” , Manual 20-38, Revised Sep. 15, 2007 (229 pages).

ITW Dynatec, “Dynamelt D15/D25/D45 Series”, Revised Jun. 2015 ASU Manual #20-63 (234 pages).

ITW Dynatec, “ITW Dynatec SR Adhesive Supply Unit—Packaging Plus” Printed Mar. 24, 2025 (3 pages).

* cited by examiner

HOT MELT ADHESIVE LEVEL SENSING DEVICE AND SYSTEM

CROSS-REFERENCE TO RELATED APPLICATIONS

This application claims priority to U.S. Provisional Application No. 63/575,869 (filed 8 Apr. 2024), the entire disclosure of which is incorporated herein by reference.

BACKGROUND

Technical Field

The subject matter described herein relates to sensors that detect a quantity of material in a container, such as a level of melted adhesive in a hopper.

Discussion of Art

Sensors can be used to measure the quantity of fluids in a container. For example, capacitive sensors can be used to detect whether liquids in containers are at or below the locations of the sensors. These sensors may be used, for example, to detect the level at which a hot melt adhesive is in a hopper. The sensor may output a signal (or not output a signal) if the melted adhesive is in contact with the sensor. The sensor can be positioned in the hopper so that the signal that is output by the sensor can indicate whether the adhesive is at (or below) the location of the sensor. This can indicate how much adhesive is in the hopper.

But operation of these sensors can fail over time due to exposure to the fluid being sensed. For example, the adhesive can stick to the sensor and interfere or stop operation of the sensor. A need may exist for an improved sensor that continues to operate longer than capacitive sensors.

BRIEF DESCRIPTION

In one example, a sensing system includes a temperature sensor that measures a temperature inside a hopper, a heating element that generates heat inside the hopper to melt or heat an adhesive in the hopper according to a duty cycle, and a controller that examines the temperature measured inside the hopper and determines whether the duty cycle of the heating element is to be changed based on the temperature that is measured. The controller determines a level of the adhesive in the hopper based on the duty cycle of the heating element.

In another example, a method includes measuring a temperature inside a hopper with a temperature sensor, generating heat inside the hopper using a heating element to melt or heat an adhesive in the hopper according to a duty cycle, determining whether the duty cycle of the heating element is to be changed based on the temperature that is measured using a controller, and identifying a level of the adhesive in the hopper using the controller based on the duty cycle of the heating element.

In another example, a hot melt adhesive level sensing system includes a heating element that heats adhesive inside a container according to a duty cycle, and a controller that identifies a level of the adhesive in the container based on the duty cycle of the heating element.

BRIEF DESCRIPTION OF THE DRAWINGS

The subject matter may be understood from reading the following description of non-limiting embodiments, with reference to the attached drawings, wherein below.

DETAILED DESCRIPTION

Embodiments of the subject matter described herein relate to sensing devices that can be used to detect how much of a material is in a container. The sensing devices can be placed into hoppers containing melted adhesive, or alternatively can be used in another container and/or to sense the amount of another material in the container. The sensing devices can include temperature control modules that change the temperature of the material. For example, the sensing devices can include heating elements that generate heat to increase the temperature of the material in the container or maintain the temperature of the material at a designated temperature (e.g., above the melting point of the material). These heating elements can include resistive elements through which electric energy is conducted to generate heat.

The sensing devices also can include one or more temperature sensors that measure the temperature of the material that is in contact with the sensors. The heating elements can be activated during duty cycles to heat the material. The temperature sensor(s) can measure the temperature of the material, and the duty cycles of the heating elements can be examined to determine how much heat is required to be generated by the heating elements to maintain the material at a designated temperature (or within a designated temperature range). The longer that the heating element of a sensing device is required to be turned on and generating heat to keep the material at the designated temperature, the more thermal mass of the material is in contact with the temperature sensor. The shorter that the heating element is required to be turned on and generating heat to keep the material at the designated temperature, the less thermal mass of the material is in contact with the temperature sensor. As the thermal mass of the material decreases, less of the material is in contact with the sensor and, therefore, in the container or hopper.

Figure 1:
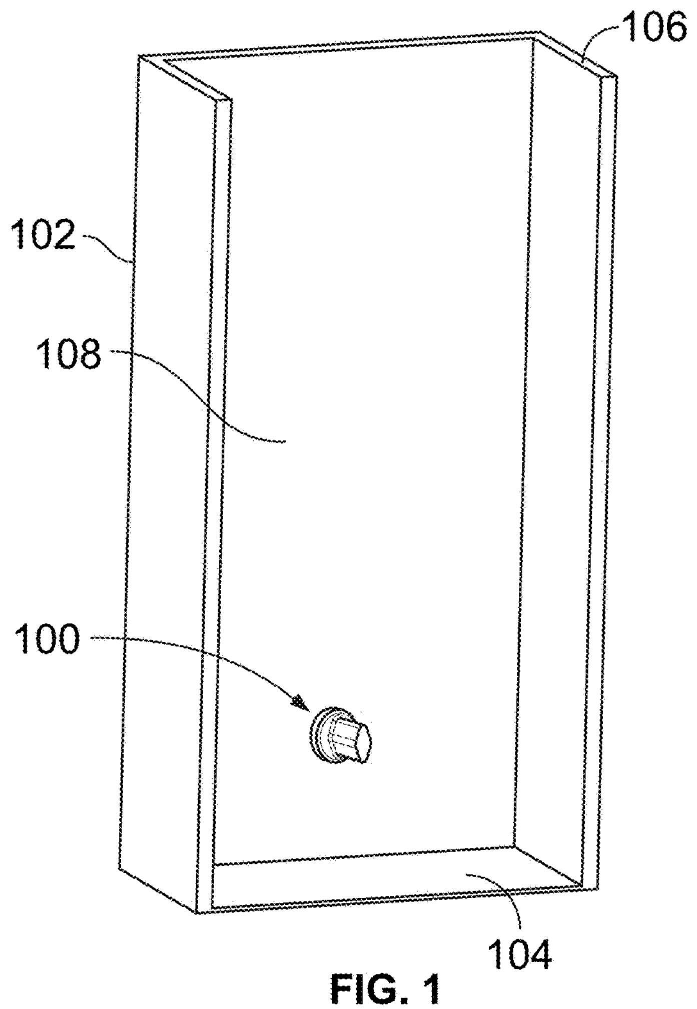
FIG. 1 illustrates one example of a sensing device in a container.

FIG. 1 illustrates one example of a sensing device 100 in a container 102. The container 102 may be a hopper or other vessel for holding a material, such as a fluid. In one embodiment, the material is an adhesive that melts while heated to temperatures at or above a melting temperature of the adhesive and that solidifies while not at temperatures at or above the melting temperature. While one or more examples described herein relate to the sensing device 100 detecting melted adhesive, not all embodiments are limited to sensing adhesives unless explicitly stated. The sensing device 100 can be positioned in the container 102 in a location to sense whether the adhesive is at or above the sensing device 100. This can help to measure whether more adhesive needs to be added to the container 102. In the illustrated example, the sensing device 100 is closer to a bottom side 104 of the container 102 than a top side 106 of the container 102. This can be useful to detect whether the container 102 is nearly depleted of adhesive. The container

102 can include side walls 108 that hold the adhesive within the container 102. The container 102 can be connected with one or more other systems that dispense the adhesive for various purposes.

Figure 2:
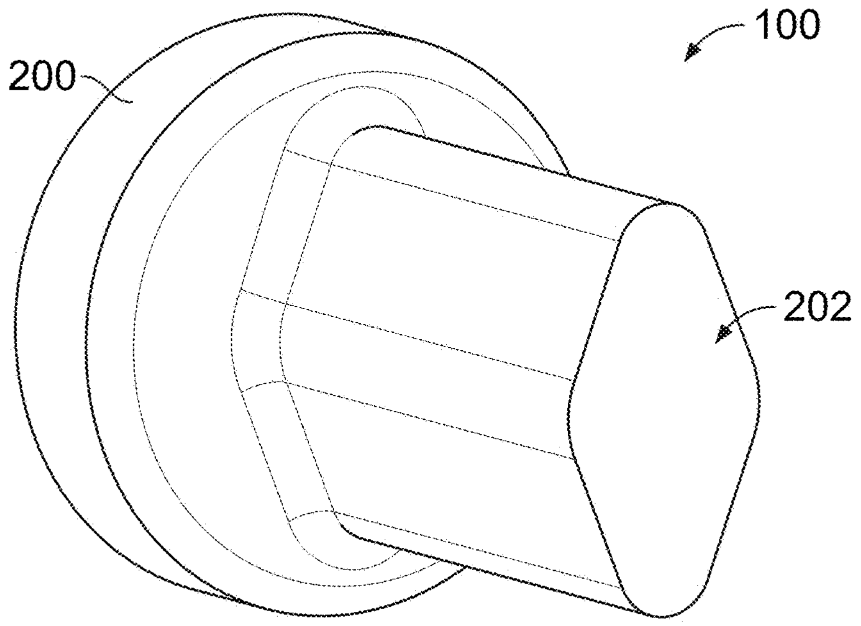
FIG. 2 illustrates a front view of the sensing device shown in FIG. 1.
Figure 3:
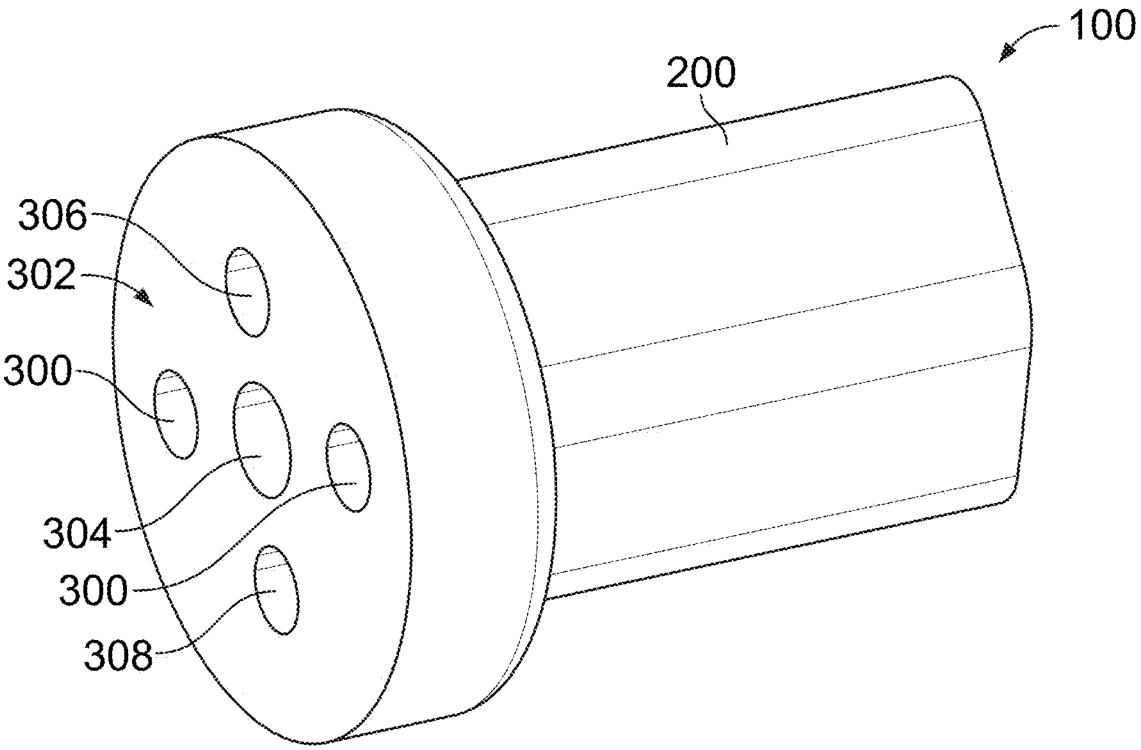
FIG. 3 illustrates a back view of the sensing device shown in FIG. 1.
Figure 4:
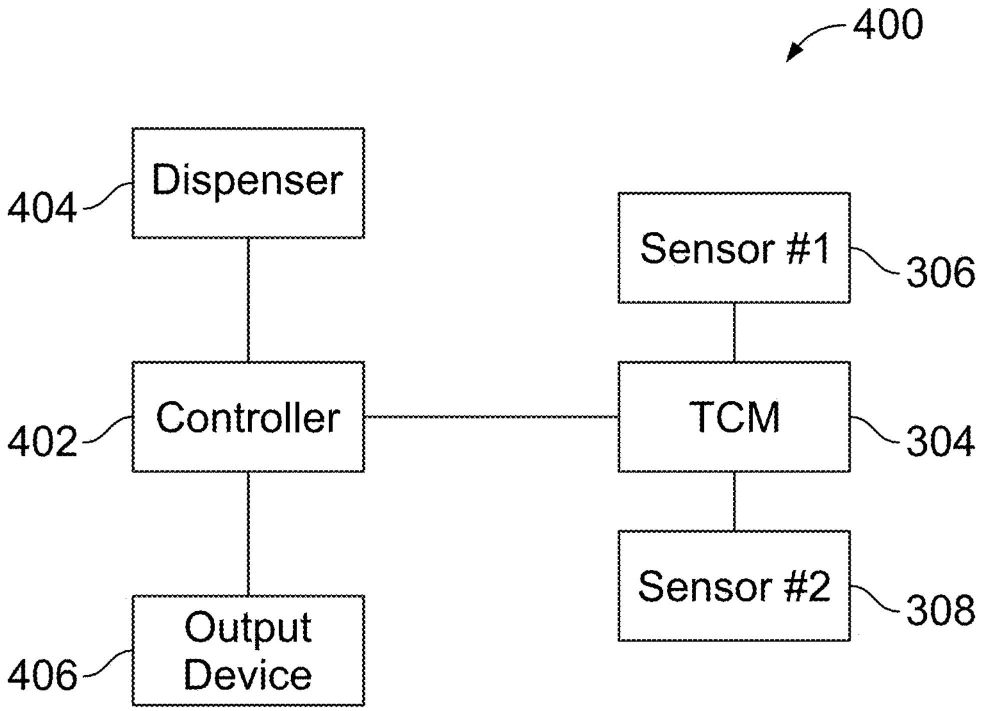
FIG. 4 schematically illustrates a sensing system that includes the sensing device shown in FIG. 1 and a controller.

FIG. 2 illustrates a front view of the sensing device 100 shown in FIG. 1. FIG. 3 illustrates a back view of the sensing device 100 shown in FIG. 1. FIG. 4 schematically illustrates a sensing system 400 that includes the sensing device 100 shown in FIG. 1 and a controller 402. The sensing device 100 can be attached to one of the side walls 108 of the container 102. For example, the sensing device 100 can include an exterior housing 200 having mounting holes 300 on a back side 302 of the housing 200. One or more fasteners can attach the housing 200 to the side wall 108 via these mounting holes 300. Optionally, a thermally insulative body can be placed between the back side 302 of the housing 200 and the side wall 108. For example, a disk formed from polytetrafluoroethylene (PTFE) can be placed between the back side 302 of the housing 200 and the side wall 108. This can prevent the temperature of the side wall 108 from interfering with measuring the temperature of the adhesive in the container 102. Optionally, the sensing device 100 can be coupled to the bottom wall 104 of the container 102.

The sensing device 100 includes a temperature control module 304 ("TCM" in FIG. 4). This temperature control module 304 can represent a heating element, such as one or more electrically resistive bodies that convert electric energy (e.g., electric potential or current) into heat. The heating element can be disposed within the housing 200 and heat the adhesive outside of the housing 200 through the housing 200. The heating element can be connected with the controller 402 of the sensing system 400, which can represent hardware circuitry that includes and/or is connected with one or more processors (e.g., field programmable gate arrays, integrated circuits, microprocessors, etc.) that perform the operations described herein in connection with the controller 402. Optionally, the controller 402 may be housed within the sensing device 100.

The sensing device 100 includes two temperature sensors 306, 308 ("Sensor #1" and "Sensor #2" in FIG. 4). Alternatively, the sensing device 100 can include a single temperature sensor 306 or 308, or more than two temperature sensors 306, 308. Multiple temperature sensors 306, 308 may be used for redundancy purposes, to more accurately measure the temperature of the adhesive in the container 102, or the like. For example, one temperature sensor 306 can be located in the sensing device 100 higher in the container 102 than the other temperature sensor 308. This can allow the sensing device 100 to obtain multiple measurements of the adhesive temperature in different locations, which can provide a more accurate temperature measurement of the adhesive when compared with a single point or source of the temperature measurement.

The temperature sensors 306, 308 may be located in the housing 200 farther from the back side 302 of the housing 200 than an opposite front side 202 of the housing 200. Stated differently, the temperature sensors 306, 308 may extend into the housing 200 and be closer to the front side 202 than the back side 302. The housing 200 can be formed from a material that allows the temperature sensors 306, 308 to measure the temperature of the adhesive through the housing 200 and for the heating element to heat the adhesive through the housing, such as a polymer that is not too thick to prevent heat from passing through.

In operation, the temperature sensors 306, 308 measure the temperature to which the temperature sensors 306, 308 are exposed. If the housing 200 is not in contact with any adhesive (in solid or liquid form), then the temperature sensors 306, 308 may measure the temperature of the air around the sensing device 100. If the housing 200 is in contact with adhesive in a solid form (e.g., pellets of the adhesive), then the temperature sensors 306, 308 may measure the temperature of the pellets and/or air around the sensing device 100. If the housing 200 is in contact with liquid adhesive, then the temperature sensors 306, 308 may measure the temperature of the liquid adhesive.

The measured temperatures can be sent from the sensors 306, 308 to the controller 402. The controller 402 may be external to the sensing device 100 and may receive signals from the sensors 306, 308 that are indicative of the measured temperatures. The controller 402 may be connected with the sensors 306, 308 by wired connections, wireless connections, or both wired and wireless connections. The controller 402, sensors 306, 308, and the temperature control module 304 may be powered by an external or internal source, such as a utility power grid, batteries, capacitors, or the like.

The controller 402 can examine the measured temperatures and determine whether at least one, all, or a combination of the temperatures (e.g., an average or median) is at a designated temperature or within a designated temperature range. This designated temperature or temperature range may be at, above, or slightly below the melting temperature of the adhesive. For example, the designated temperature may be within 140 degrees Celsius to 185 degrees Celsius, between 140 degrees Celsius to 170 degrees Celsius, or the like. The designated temperature range may be 140 degrees Celsius to 185 degrees Celsius, between 140 degrees Celsius to 170 degrees Celsius, or the like. The range may include temperatures that are within manufacturing tolerances or accuracies of the sensors 306, 308.

If the measured temperature(s) is below the designated temperature or the designated temperature range, then the controller 402 can decide that the adhesive needs to be heated. The controller 402 can activate the heating element or increase the duty cycle of the heating element. The duty cycle of the heating element can be the fraction of time that the heating element is on or activated and generating heat. For example, the duty cycle can be the ratio of time that the heating element is generating heat to the time that the heating element is not generating heat. Increasing the duty cycle of the heating element can result in the heating element being on and generating heat a larger fraction, percentage, or ratio of time compared to decreasing the duty cycle of the heating element. Increasing the duty cycle of the heating element can generate more heat that is transferred to the adhesive compared with decreasing the duty cycle of the heating element.

If the measured temperature(s) is above the designated temperature or designated temperature range, then the controller 402 can decide that the adhesive does not need to be heated, or can be heated less. The controller 402 can deactivate the heating element or decrease the duty cycle of the heating element. This can cause less heat to be generated and transferred into the adhesive.

If the measured temperature(s) is at the designated temperature or within the designated temperature range, then the controller 402 can decide that the adhesive does not need to be significantly heated, but cannot be allowed to cool too much. The controller 402 can maintain the duty cycle of the heating element (e.g., not increase or decrease the duty cycle). This can cause the same amount of heat to be generated and transferred into the adhesive as before the temperature(s) were measured.

The controller 402 can identify the phase of the adhesive and/or whether the adhesive is at or above the sensing device 100 based on the duty cycle that is determined by the controller 402. The duty cycle of the heating element increases when there is more thermal mass of the adhesive. This can occur when the adhesive is in the liquid phase and/or in contact with the sensing device 100. The controller 402 can determine that the adhesive is in the liquid phase and that the amount of adhesive in the container 102 is at or above the sensing device 100 responsive to the duty cycle of the heating element being at or above a designated duty cycle. For example, if the duty cycle of the heating element as set by the controller 402 based on the measured temperature(s) is at or above 75% or 0.75, then the controller 402 can determine that the adhesive is in the liquid phase and the container 102 holds an amount of liquid adhesive that is at or above the sensing device 100.

The duty cycle of the heating element decreases when there is less thermal mass of the adhesive. This can occur when the adhesive is in the solid phase (e.g., in pellet form) and/or not in contact with the sensing device 100. The controller 402 can determine that the adhesive is in the solid phase and/or that the amount of adhesive in the container 102 is not at or above the sensing device 100 responsive to the duty cycle of the heating element being below the designated duty cycle. For example, if the duty cycle of the heating element as set by the controller 402 based on the measured temperature(s) is below 75% or 0.75, then the controller 402 can determine that the adhesive is not in the liquid phase and/or the container 102 does not hold an amount of liquid adhesive that is at or above the sensing device 100.

The controller 402 can repeatedly receive the temperature measurement(s) from the temperature sensors 306, 308, compare the temperature measurement(s) to the designated temperature or temperature range, determine whether to adjust the duty cycle of the heating element, and optionally change the duty cycle of the heating element. Responsive to determining that the adhesive is not at or above the sensing device 100, the controller 402 optionally can generate and send a control signal to a dispenser 404. The dispenser 404 can represent another container holding more of the adhesive, which may be in solid, pellet form or liquid form. Responsive to receiving the control signal, the dispenser 404 may dispense more adhesive into the container 102. For example, a door may open to dispense adhesive pellets into the container 102 via a chute, a valve may open to dispense the adhesive into the container 102, or the like. Optionally, the control signal may be sent to an output device 406, such as a display, a lamp/light, a speaker, or the like. This can be used to generate an alarm or notification to an operator to inform the operator that more adhesive needs to be added to the container 102.

While only one sensing device 100 is shown in the container 102, optionally, the sensing system 400 may include multiple sensing devices 100. These sensing devices 100 may be at the same level, or height, above the bottom wall 104 of the container 102 (e.g., for redundancy purposes). Optionally, the multiple sensing devices 100 may be at different levels or heights above the bottom wall 104 of the container 102. For example, different sensing devices 100 may sense for adhesive being melted at different levels or heights within the container 104.

Figure 5:
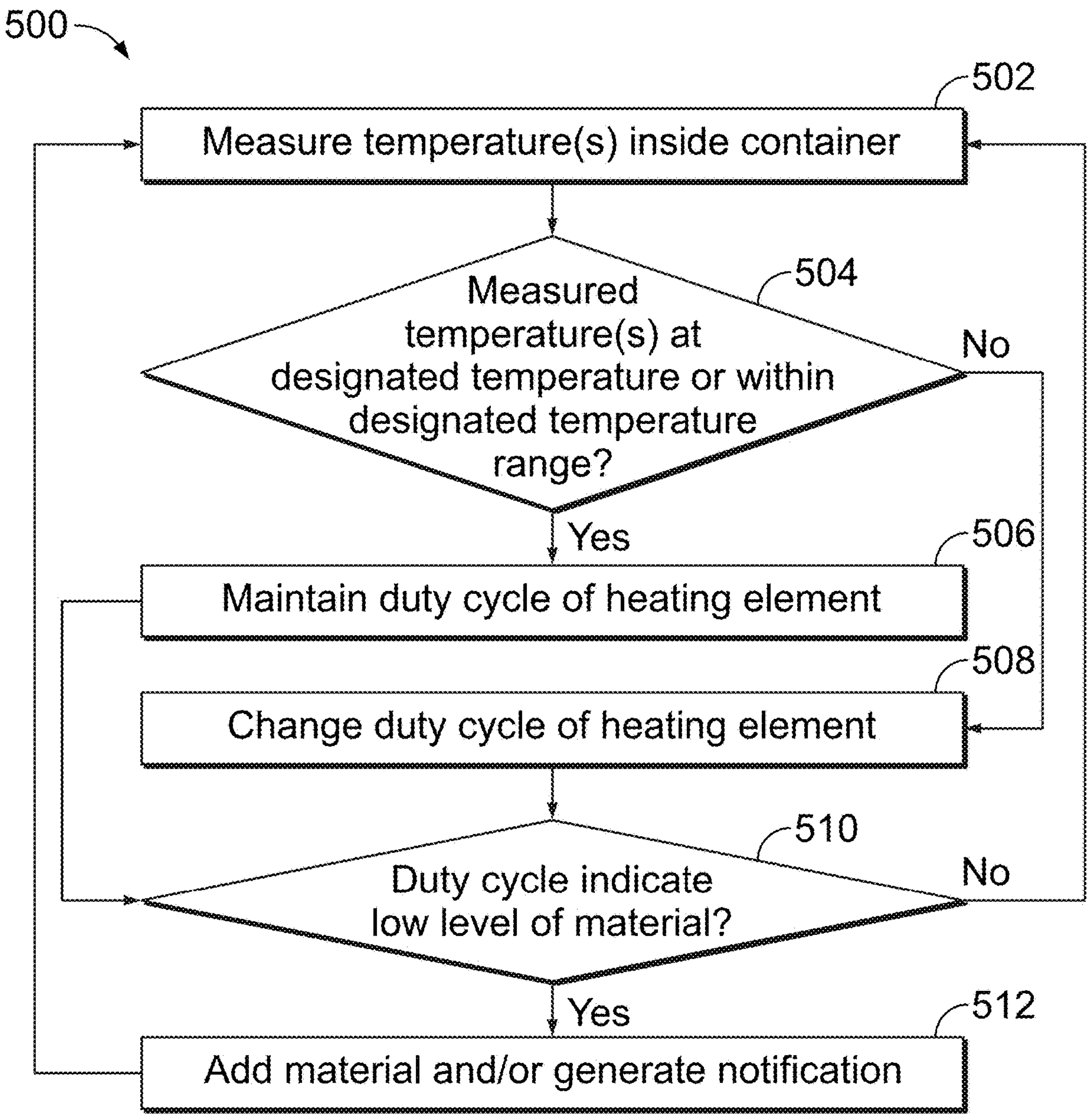
FIG. 5 illustrates a flowchart of one example of a method for detecting an amount of material in a container.

FIG. 5 illustrates a flowchart of one example of a method 500 for detecting an amount of material in a container. The method 500 can represent operations performed by the sensing device 100 and/or the controller 402. At 502, one or more temperatures are measured inside the container. At 504, a decision is made as to whether the temperature(s) that is or are measured are at a designated temperature or within a designated temperature range. If the measured temperature(s) is or are at the designated temperature or within the designated temperature range, then flow of the method 500 can proceed toward 506. Otherwise, flow of the method 500 can proceed toward 508.

At 506, the duty cycle of the heating element is maintained. For example, the duty cycle for heating the material in the container is not changed. At 508, the duty cycle is changed. For example, if the measured temperature(s) is or are below the designated temperature or temperature range, then the duty cycle may be increased. Otherwise, the duty cycle may be decreased. At 510, a decision is made as to whether the duty cycle indicates a low level of material in the container. For example, large or high duty cycle may indicate that there is more thermal mass of the material in the container than a lower duty cycle. Conversely, a smaller duty cycle can indicate that less thermal mass of the material is in the container. If the duty cycle indicates a higher thermal mass (e.g., a thermal mass that exceeds a threshold thermal mass), then the duty cycle can indicate a sufficient or high level or amount of the material in the container. As a result, flow of the method 500 can return toward 502 or can terminate. If the duty cycle indicates a lower thermal mass (e.g., a thermal mass that does not exceed the threshold thermal mass), then the duty cycle can indicate an insufficient or low level or amount of the material in the container. As a result, flow of the method 500 can proceed toward 512. At 512, more material can be added to the container and/or a notification can be generated, as described herein. Flow of the method 500 can then terminate or return toward 502.

If a system, apparatus, assembly, device, etc. (e.g., a controller, control device, control unit, etc.) includes multiple processors, these processors may be located in the same housing or enclosure (e.g., in the same device) or may be distributed among or between two or more housings or enclosures (e.g., in different devices). The multiple processors in the same or different devices may each perform the same functions described herein, or the multiple processors in the same or different devices may share performance of the functions described herein. For example, different processors may perform different sets or groups of the functions described herein.

As used herein, the "one or more processors" may individually or collectively, as a group, perform these operations. For example, the "one or more" processors can indicate that each processor performs each of these operations, or that each processor performs at least one, but not all, of these operations.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, an element or step recited in the singular and preceded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function devoid of further structure.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A sensing system comprising:

a temperature sensor configured to measure a temperature inside a hopper;

a heating element configured to generate heat inside the hopper to melt or heat an adhesive in the hopper according to a duty cycle; and a controller configured to examine the temperature measured inside the hopper and determine whether the duty cycle of the heating element is to be changed based on the temperature that is measured, the controller configured to determine a level of the adhesive in the hopper based on the duty cycle of the heating element.

2. The sensing system of claim 1, wherein the controller is configured to automatically control a dispenser to insert more of the adhesive into the hopper based on the level of the adhesive that is determined by the controller based on the duty cycle of the heating element.

3. The sensing system of claim 1, wherein the temperature sensor and the heating element are disposed inside a housing configured to be coupled to a side wall of the hopper.

4. The sensing system of claim 3, wherein the controller is configured to determine whether the adhesive is melted and whether the level of the adhesive is up to a location of the housing based on the duty cycle of the heating element.

5. The sensing system of claim 1, wherein the temperature sensor is a first temperature sensor and the temperature that is measured is a first temperature, and further comprising:

a second temperature sensor configured to measure a second temperature inside the hopper but at a different location than the first temperature sensor measures the first temperature, wherein the controller is configured to examine the first temperature and second temperatures measured inside the hopper and determine whether the duty cycle of the heating element is to be changed based on the first temperature and the second temperature that are measured.

6. The sensing system of claim 1, wherein the controller is configured to direct an output device to generate a notification based on the level of the adhesive that is determined by the controller based on the duty cycle of the heating element.

7. A method comprising:

measuring a temperature inside a hopper with a temperature sensor;

generating heat inside the hopper using a heating element to melt or heat an adhesive in the hopper according to a duty cycle;

determining whether the duty cycle of the heating element is to be changed based on the temperature that is measured using a controller; and identifying a level of the adhesive in the hopper using the controller based on the duty cycle of the heating element.

8. The method of claim 7, further comprising:

automatically controlling a dispenser to insert more of the adhesive into the hopper based on the level of the adhesive that is identified based on the duty cycle of the heating element.

9. The method of claim 7, further comprising:

determining whether the adhesive is melted in the hopper based on the duty cycle of the heating element.

10. The method of claim 7, further comprising:

determining whether the adhesive is up to a designated location in the hopper based on the duty cycle of the heating element.

11. The method of claim 7, wherein the temperature sensor is a first temperature sensor and the temperature that is measured is a first temperature, and further comprising:

measuring a second temperature inside the hopper using a second temperature sensor at a different location than the first temperature sensor measures the first temperature.

12. The method of claim 11, wherein the duty cycle of the heating element is determined to be changed based on the first temperature and the second temperature that are measured.

13. The method of claim 7, further comprising:

directing an output device to generate a notification based on the level of the adhesive that is determined by the controller based on the duty cycle of the heating element.

14. A hot melt adhesive level sensing system comprising:

a heating element configured to heat adhesive inside a container according to a duty cycle; and a controller configured to identify a level of the adhesive in the container based on the duty cycle of the heating element.

15. The hot melt adhesive level sensing system of claim 14, further comprising:

a temperature sensor configured to measure a temperature inside the container, wherein the controller is configured to examine the temperature that is measured and determine whether to change the duty cycle of the heating element based on the temperature that is measured.

16. The hot melt adhesive level sensing system of claim 15, wherein the temperature sensor is a first temperature sensor and the temperature that is measured is a first temperature, and further comprising:

a second temperature sensor configured to measure a second temperature inside the container but at a different location than the first temperature sensor measures the first temperature, wherein the controller is configured to examine the first temperature and second temperatures measured inside the container and determine whether the duty cycle of the heating element is to be changed based on the first temperature and the second temperature that are measured.

17. The hot melt adhesive level sensing system of claim 14, wherein the controller is configured to automatically control a dispenser to insert more of the adhesive into the container based on the level of the adhesive that is identified by the controller.

18. The hot melt adhesive level sensing system of claim 14, wherein the heating element is disposed inside a housing configured to be coupled to a side wall of the container.

19. The hot melt adhesive level sensing system of claim 18, wherein the controller is configured to determine whether the adhesive is melted, and the level of the adhesive is up to a location of the housing based on the duty cycle of the heating element.

20. The hot melt adhesive level sensing system of claim 14, wherein the controller is configured to direct an output device to generate a notification based on the level of the adhesive that is identified by the controller.

* * * * *